United States Patent [19]

Welschof et al.

[11] 4,424,047
[45] Jan. 3, 1984

[54] WHEEL BEARING ASSEMBLY

[75] Inventors: Hans-Heinrich Welschof, Rodenbach; Rudolf Beier, Offenbach am Main, both of Fed. Rep. of Germany

[73] Assignee: Löhr & Bromkamp GmbH, Offenbach am Main, Fed. Rep. of Germany

[21] Appl. No.: 319,051

[22] Filed: Nov. 6, 1981

[30] Foreign Application Priority Data

Nov. 11, 1980 [DE]  Fed. Rep. of Germany ....... 3042449

[51] Int. Cl.³ .................... F16C 33/00; F16D 3/24
[52] U.S. Cl. ................... 464/145; 180/70 R; 308/191; 464/178; 464/906
[58] Field of Search ............... 464/143, 144, 145, 175, 464/178, 906; 308/191; 280/96.1; 180/70.1

[56] References Cited

U.S. PATENT DOCUMENTS

| | | | |
|---|---|---|---|
| 3,583,511 | 6/1971 | Asberg | 180/70.1 |
| 3,757,883 | 9/1973 | Asberg | 308/191 X |
| 3,940,194 | 2/1976 | Asberg | . |
| 3,944,011 | 3/1976 | Ernst et al. | 180/70.1 |
| 4,094,376 | 6/1978 | Welschof | 308/191 X |
| 4,305,263 | 12/1981 | Kako et al. | 464/145 |

FOREIGN PATENT DOCUMENTS

| | | |
|---|---|---|
| 1480012 | 4/1973 | Fed. Rep. of Germany . |
| 2505081 | 8/1977 | Fed. Rep. of Germany . |
| 1416989 | 12/1975 | United Kingdom ............... 464/143 |

*Primary Examiner*—John Petrakes
*Assistant Examiner*—Daniel P. Stodola
*Attorney, Agent, or Firm*—Toren, McGeady and Stanger

[57] ABSTRACT

A wheel bearing assembly for use in an automotive vehicle includes a wheel hub. A rotary constant velocity joint drives the wheel hub and the outer member of the constant velocity joint is an integral part of the wheel hub. A bearing is mounted on a tubular part of the wheel hub and includes an outer bearing ring and a two-part inner bearing ring. A retaining ring secures the two-part inner bearing ring on the tubular part of the wheel hub. The retaining ring is secured in a groove in the tubular part and in the secured position it is plastically deformed and pretensions the inner bearing ring.

5 Claims, 6 Drawing Figures

WHEEL BEARING ASSEMBLY

SUMMARY OF THE INVENTION

The present invention is directed to a bearing assembly for a wheel hub driven by a rotary constant velocity joint and secured to an associated wheel carrier on a motor vehicle. The bearing assembly includes an outer bearing ring and a two-part inner bearing ring. The outer bearing ring is arranged to be connected to the wheel carrier. The wheel hub and the outer joint member of the rotary constant velocity joint are formed as a unit. The two-part inner bearing ring is axially supported against a shoulder formed on the wheel hub.

As shown in West German Patentschrift No. 25 05 081 bearings of this type having divided inner bearing rings are known. To assure satisfactory functioning of such two-part, non-adjustable tapered bead seat bearings, the bearings must be tensioned in the axial direction by high pretensioning forces. Such pretensioning forces are applied by forming a thread in the axle shaft and applying axially directed forces by securing a nut on the thread.

In other bearing assemblies, such as in the West German Patentschrift No. 14 80 912, it is known to position the wheel bearing approximately outwardly about the joint center to afford small vehicle turning circles. As a consequence, the thread diameter is increased and due to the required minimum pitch values, the tightening moments for the retaining rings are required such that they cannot be safely achieved using standard wrenches.

Therefore, it is the primary object of the present invention to provide a bearing assembly for an automotive wheel unit using a divided inner bearing ring arranged so that the inner bearing ring can be axially pretensioned to a desired extent.

In accordance with the present invention the end of the inner bearing ring of the bearing assembly closer to the rotary constant velocity joint is fixed in the axial direction by a retaining ring. The retaining ring is held in a groove formed on the outer surface of the portion of the wheel hub forming the outer joint member.

In accordance with the present invention, by purposefully deforming the retaining ring securing the two-part inner bearing ring in position, a sufficient axial pretensioning of the inner bearing ring can be achieved. Such axial pretensioning is afforded by a sheet metal ring supported against one end face of the two-part inner bearing ring with the opposite end face held against a shoulder formed in a groove in the outer joint member constructed integrally with the wheel hub. The required axial pretensioning is attained by deliberately plastically deforming the retaining ring as it is inserted into a groove for holding the two-part inner bearing ring. To accommodate the various tolerances between the bearing rings and the remaining components, a definite flow behavior of the material of the retaining ring is needed to that at least a minimum axial pressure affording the desired pretensioning forces is achieved. Moreover, a predetermined maximum axial pressure must not be exceeded to ensure proper functioning of the bearing assembly. The minimum axial pressure is an amount greater than eight tons.

To assure sufficient support for the retaining ring, another feature of the present invention is that the groove into which the retaining ring is inserted has surfaces extending at an angle to the axial direction of the wheel hub and its associated rotary constant velocity joint.

When the retaining ring is placed into the groove and against one end of the two-part inner bearing ring, it is plastically deformed providing the desired pretensioning effect.

In accordance with the present invention, the retaining ring is deformed until the yield point is reached for assuring a uniform pretension around the entire circumference of the bearing ring. To facilitate this procedure, the retaining ring is made of a material having a definite flow behavior.

Another feature of the present invention is that the surfaces forming the groove have a frusto-conical shape. In accordance with the present invention, the greatest resistance moments of the retaining ring are obtained when the ring is supported on the frusto-conically shaped surfaces of the groove formed in the tubular part of the wheel hub.

In one embodiment of the present invention, initially the retaining ring has a curved cross-section, however, after being inserted into the groove in the tubular part of the wheel hub it assumes a straight or frusto-conical cross-section.

The advantage of this arrangement is that the retaining ring exceeds its yield point and thereby applies a uniform and sufficiently high pretension around the entire circumference of the two-part inner bearing ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
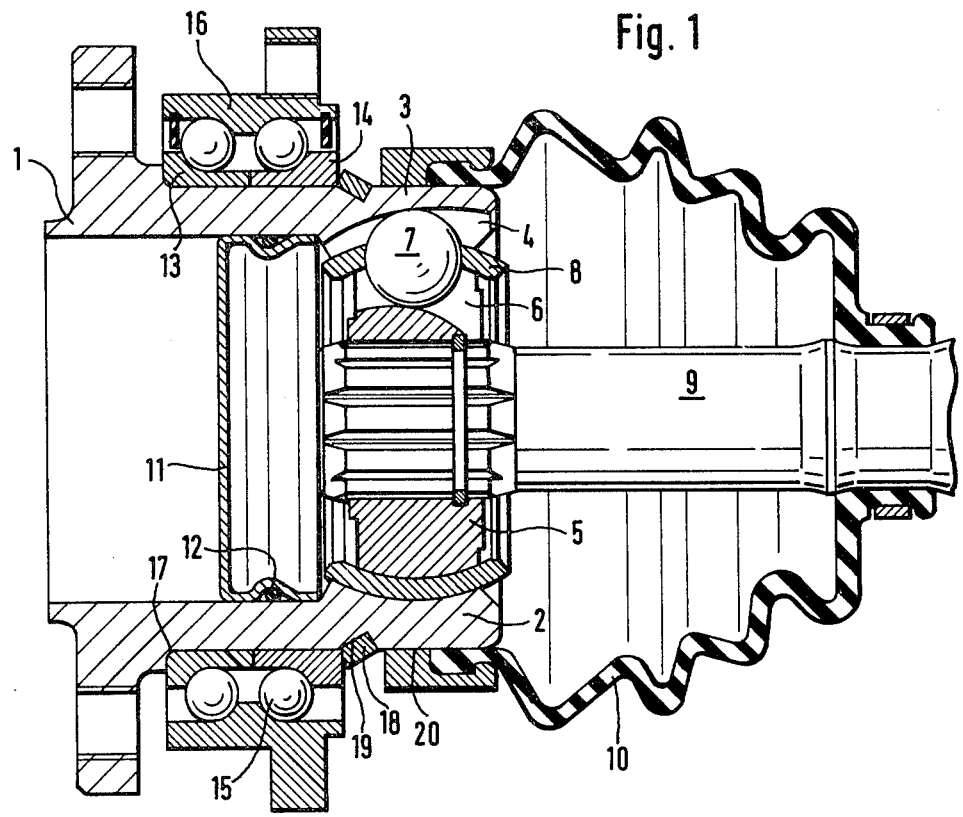
FIG. 1 is an axially extending view, partly in section, of a wheel bearing including a rotary constant velocity joint.
Figure 2:
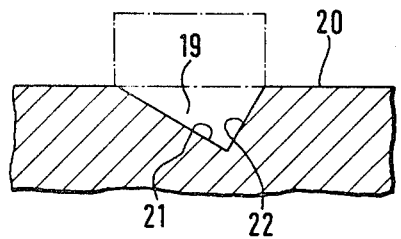
FIG. 2 is an enlarged detail view of one embodiment of the groove shown in FIG. 1.
Figure 3:
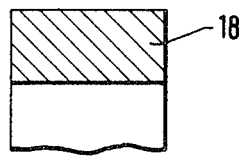
FIGS. 3-6 are cross sectional views of a number of different embodiments of a retaining ring insertable into the groove shown in FIG. 2.
Figure 4:
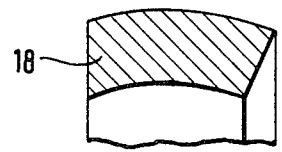
Figure 5:
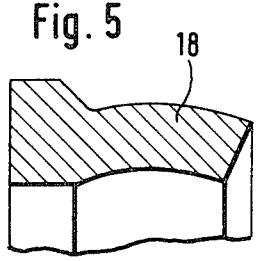
Figure 6:
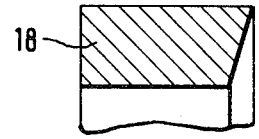

In FIG. 1 a motor vehicle wheel bearing assembly is illustrated including a wheel hub 1 including an axially extending tubular extension 2 with an outer joint member 3 of a rotary constant velocity joint being formed as a part of the wheel hub. The wheel hub has a first end and a second end spaced apart in the axial direction with the outer joint member 3 located at the second end of the wheel hub. As in rotary constant velocity joints, the outer joint member 3 defines an inner hollow space having axially extending grooves 4. An inner joint member 5 is located within the hollow space and it also has axially extending grooves 6. Balls 7 held in windows of a cage 8 extend into a pair of opposite grooves 4 and 6 for transmitting torque between the inner and outer joint members 3, 5. A shaft 9 has a splined end secured within a correspondingly shaped opening in the inner joint part. While a splined connection is shown the shaft 9 and inner joint member 5 can be secured together by